(12) United States Patent
Kimba et al.

(10) Patent No.: US 6,657,737 B2
(45) Date of Patent: Dec. 2, 2003

(54) METHOD AND APPARATUS FOR MEASURING FILM THICKNESS

(75) Inventors: Toshifumi Kimba, Kanagawa-ken (JP); Shunsuke Nakai, Kanagawa-ken (JP)

(73) Assignee: Ebara Corporation, Tokyo (JP)

( * ) Notice: Subject to any disclaimer, the term of this patent is extended or adjusted under 35 U.S.C. 154(b) by 381 days.

(21) Appl. No.: 09/733,927

(22) Filed: Dec. 12, 2000

(65) Prior Publication Data

US 2001/0052987 A1 Dec. 20, 2001

(30) Foreign Application Priority Data

Dec. 13, 1999 (JP) .......................... 11-353692

(51) Int. Cl.$^7$ .............................................. G01B 11/06
(52) U.S. Cl. ...................... 356/630; 356/632
(58) Field of Search ................ 356/630, 631, 356/632; 451/6, 8, 526, 41, 287, 285; 438/16, 692, 693, 697; 216/85, 88, 89; 250/559.27

(56) References Cited

U.S. PATENT DOCUMENTS

| | | | | |
|---|---|---|---|---|
| 5,099,614 A | * | 3/1992 | Arai et al. ....................... 451/8 |
| 5,433,651 A | * | 7/1995 | Lustig et al. .................... 451/6 |
| 5,609,511 A | * | 3/1997 | Moriyama et al. .............. 451/5 |
| 5,672,091 A | * | 9/1997 | Takahashi et al. .............. 451/6 |
| 5,708,560 A | * | 1/1998 | Kumar et al. ................ 361/680 |
| 5,893,796 A | * | 4/1999 | Birang et al. ................ 451/526 |
| 5,964,643 A | * | 10/1999 | Birang et al. .................. 451/6 |
| 6,045,439 A | * | 4/2000 | Birang et al. ................ 451/526 |
| 6,106,662 A | * | 8/2000 | Bibby et al. ........... 156/345.13 |
| 6,120,349 A | * | 9/2000 | Nyui et al. .................... 451/21 |
| 6,146,248 A | * | 11/2000 | Jairath et al. ................. 451/41 |

FOREIGN PATENT DOCUMENTS

JP 11-160028 6/1999

* cited by examiner

*Primary Examiner*—Hoa Q. Pham
(74) *Attorney, Agent, or Firm*—Wenderoth, Lind & Ponack, L.L.P.

(57) ABSTRACT

A film thickness measuring method and apparatus sets forth a spectral reflectance ratio $S(\lambda)$ at a spot where the film to be measured is present and a spectral reflectance ratio $R(\lambda)$ at a spot where the film to be measured is not present are measured to determine a spectral reflectance ratio Rmeas $(\lambda)=S(\lambda)/R(\lambda)$. A theoretical value $Rcalc(\lambda)$ of the spectral reflectance ratio at an assumed film thickness d is determined, and an evaluation value Ed is determined from the total sum of differences between the value of $Rmeas(\lambda)$ and the value of $Rcalc(\lambda)$. Assuming that the spectral reflectance ratio $Rmeas(\lambda e)$ of the film is 1 ($Rmeas(\lambda e)=1$), an evaluation value Enewd is determined. The film thickness d is changed to determine an evaluation function Enew(d). An evaluation function ratio PE(d) is determined from E(d)/Enew(d), and a film thickness d that gives a minimum value of the ratio PE(d) is determined to be a measured film thickness D.

2 Claims, 14 Drawing Sheets

FILM THICKNESS CALCULATING FLOW IN FILM THICKNESS MEASURING APPARATUS ACCORDING TO PRESENT INVENTION

FILM THICKNESS CALCULATING FLOW IN CONVENTIONAL FILM THICKNESS MEASURING APPARATUS

FILM THICKNESS CALCULATING FLOW IN CONVENTIONAL
FILM THICKNESS MEASURING APPARATUS

SPECTRAL REFLECTANCE RATIOS AT SPOT WHERE FILM UNDER MEASUREMENT IS PRESENT AND AT SPOT WHERE FILM IS NOT PRESENT, TOGETHER WITH SPECTRAL REFLECTANCE RATIO OF FILM, WITH RESPECT TO LIGHT WAVELENGTH (WHEN SPECTRAL REFLECTION INTENSITY IS HIGH).

EVALUATION FUNCTION OF THEORETICAL AND MEASURED VALUES OF SPECTRAL REFLECTANCE RATIO WITH RESPECT TO FILM THICKNESS (WHEN SPECTRAL REFLECTION INTENSITY IS HIGH)

SPECTRAL REFLECTANCE RATIOS AT SPOT WHERE FILM UNDER MEASUREMENT IS PRESENT AND AT SPOT WHERE FILM IS NOT PRESENT, TOGETHER WITH SPECTRAL REFLECTANCE RATIO OF FILM, WITH RESPECT TO LIGHT WAVELENGTH (WHEN SPECTRAL REFLECTION INTENSITY IS LOW).

EVALUATION FUNCTION OF THEORETICAL AND MEASUTED VALUES OF SPECTRAL REFLECTANCE RATIO WITH RESPECT TO FILM THICKNESS (WHEN SPECTRAL REFLECTION INTENSITY IS LOW)

SCHEMATIC OF ARRANGEMENT OF SUBSTRATE FILM THICKNESS MEASURING APPARATUS ACCORDING TO PRESENT INVENTION

STRUCTURAL EXAMPLE OF MEASURING AND
CALCULATING PART OF FILM THICKNESS MEASURING
APPARATUS ACCORDING TO PRESENT INVENTION

FILM THICKNESS CALCULATING FLOW IN FILM THICKNESS MEASURING APPARATUS ACCORDING TO PRESENT INVENTION

FILM THICKNESS CALCULATING FLOW IN FILM THICKNESS MEASURING APPARATUS ACCORDING TO PRESENT INVENTION

FILM THICKNESS CALCULATING FLOW IN FILM THICKNESS MEASURING APPARATUS ACCORDING TO PRESENT INVENTION

FILM THICKNESS CALCULATING FLOW IN FILM THICKNESS MEASURING APPARATUS ACCORDING TO PRESENT INVENTION

EVALUATION FUNCTION OF THEORETICAL AND MEASURED VALUES OF THE SPECTRAL REFLECTANCE RATIO WITH RESPECT TO FILM THICKNESS OBTAINED WITH FILM THICKNESS MEASURING APPARATUS ACCORDING TO PRESENT INVENTION (WHEN SPECTRAL REFLECTION INTENSITY IS LOW)

STRUCTURAL EXAMPLE OF CHEMICAL/MECHANICAL
POLISHING APPARATUS EQUIPPED WITH FILM
THICKNESS MEASURING APPARATUS ACCORDING
TO PRESENT INVENTION

METHOD AND APPARATUS FOR MEASURING FILM THICKNESS

BACKGROUND OF THE INVENTION

The present invention relates to a film thickness measuring apparatus for measuring a film thickness. More particularly, the present invention relates to a film thickness measuring method and a film thickness measuring apparatus in which light is projected onto a film to be measured, and reflected light from the film is received to measure the thickness of the film based on the intensity of the reflected light. It should be noted that the term "film thickness measurement" as used in this specification includes not only the measurement of a film thickness but also the detection of a substrate condition, for example, as to whether or not a metal film is present on a substrate, or the observation of a substrate condition.

There has heretofore been a film thickness measuring apparatus in which light is applied to a film under measurement, and reflected light from the upper and lower interface surfaces of the film is received. The thickness of the film is measured by making use of the phenomenon that light reflected from the upper and lower interface surfaces of the film interfere with each other, and the reflected light intensity changes according to the thickness of the film.

FIGS. 1 and 2 are flowcharts showing the process for calculating a film thickness based on the intensity of reflected light received in a conventional film thickness measuring apparatus of the type described above. To calculate a film thickness, as shown in FIG. 1, a spectral reflectance ratio $S(\lambda)$ is determined (see curve a in FIG. 3) from the spectral reflection intensity at a measuring point (a spot where the film under measurement is present) (step ST1). In addition, a spectral reflectance ratio $R(\lambda)$ is determined (see curve b in FIG. 3) from the spectral reflection intensity at a spot where the film under measurement is not present (step ST2). The spectral reflectance ratio $S(\lambda)$ is divided by the spectral reflectance ratio $R(\lambda)$ to obtain a spectral reflectance ratio (=measured profile) $Rmeas(\lambda)=S(\lambda)/R(\lambda)$ of the film (see curve c in FIG. 3) (step ST3). It should be noted that curves a and b in FIG. 3 show a case where the wavelength $\lambda$ spectrum of reflected light is continuous when a halogen lamp is used as an incident light source, for example.

To determine a film thickness value D, a variable d is used to represent the film thickness, and d is changed in a range (from d1 to d2) where the proper film thickness value is expected to be present. First, d is initialized (d=d1) (step ST4), and an evaluation value Ed is determined from the square-sum of differences between the theoretical value $Rcalc(\lambda)$ and the measured value $Rmeas(\lambda)$ of the spectral reflectance ratio at the relevant film thickness d to obtain an evaluation function E(d) (step ST5). A minimum unit (d of measurement is added to the film thickness d (d=d+$\Delta$d) (step ST6). Subsequently, it is determined whether or not d$\leq$d2 (step ST7). If d$\leq$d2, the process returns to step ST5 to repeat the processing. If d$\leq$d2 does not hold, the film thickness d that gives a minimum value of the evaluation function E(d) is determined to be a measured film thickness value D (step ST8).

FIG. 2 is a flowchart showing the processing for determining an evaluation value Ed from the square-sum of differences between the theoretical value $Rcalc(\lambda)$ and the measured value $Rmeas(\lambda)$ of the spectral reflectance ratio in the measuring wavelength range (from $\lambda 1$ to $\lambda 2$) at the relevant film thickness d at the above-described step ST5 to obtain an evaluation function E(d). First, initialization is executed ($\lambda=\lambda 1$, Ed=0) to change the wavelength $\lambda$ within the measuring wavelength range of from $\lambda 1$ to $\lambda 2$ (step ST11).

Next, an evaluation value Ed is determined by the following calculation (step ST12). The square-sum of differences between the theoretical value $Rcalc(\lambda)$ and the measured value $Rmeas(\lambda)$ at the relevant film thickness is determined.

$$E_\lambda=(Rmeas(\lambda)-Rcalc(\lambda))^2$$

$$Ed=Ed+E_\lambda$$

When the absorption coefficient is assumed to be zero, the theoretical value $Rcalc(\lambda)$ can be calculated from the following equation:

$$Rcalc(\lambda)=r1^2+r2^2+2\times r1\times r2\times \cos\delta$$

where $r1=(1-n1)/(1+n1)$; $r2=(1-nb)/(1+nb)$; $\delta=4\pi n1\,d/\lambda$; n1 is the refractive index of the film; nb is the refractive index of the substrate; d is the film thickness; and $\lambda$ is the measuring wavelength range (from $\lambda 1$ to $\lambda 2$).

Next, the resolution $\Delta\lambda$ in the direction of the measuring wavelength range is added ($\lambda=\lambda+\Delta\lambda$) (step ST13). Subsequently, it is determined whether or not $\lambda\leq\lambda 2$ (step ST14). If, $\lambda\leq\lambda 2$ the process returns to step ST12 to repeat the processing. If $\lambda\leq\lambda 2$ does not hold, the evaluation value Ed is substituted into the evaluation function E(d) (E(d)=Ed) (step ST15). Then, the process proceeds to step ST6 in FIG. 1.

Thus, the conventional process for calculating a film thickness is as follows. To obtain a spectral reflectance ratio (=measured profile) of a film under measurement, the spectral reflection intensity at a measuring point is measured, and the spectral reflection intensity for calibration (at a spot where the film under measurement is not present) is measured. Then, the former spectral reflection intensity is divided by the latter spectral reflection intensity to obtain a spectral reflectance ratio of the film. The measured profile thus obtained is compared with a theoretically calculated spectral reflectance ratio based on an assumed film thickness, and an assumed film thickness that gives a minimum difference between the measured profile and the theoretically calculated spectral reflectance ratio is determined to be a measured film thickness.

For this type of conventional film thickness measuring apparatus, mechanical and optical schemes have been devised with an emphasis on how a measured profile is obtained accurately with a good S/N ratio by optical or other techniques meeting a demand for high accuracy. Accordingly, the spectral reflection intensity obtained from the film to be measured provides a sufficiently high intensity to obtain the desired result. Therefore, the film thickness can be measured satisfactorily by an algorithm in which the measured profile and the theoretically calculated spectral reflectance ratio are compared directly to each other as stated above.

However, in a thin-film processing apparatus such as a chemical/mechanical polishing apparatus (CMP) for chemically and mechanically polishing substrates, e.g. semiconductor wafers, there has recently been an increasing demand for measurement inside the thin-film processing apparatus and measurement during processing. In this case, a film thickness measuring apparatus must be installed without interfering with polishing or other processing for which the processing apparatus is designed. In addition, because the measurement of film thickness is an accessory function, the film thickness measuring apparatus is required to be simplified in structure with a view to minimizing costs. In other words, in the measurement of a film thickness carried out inside the thin-film processing apparatus or during processing, it is difficult to detect a sufficiently high spectral reflection intensity to obtain the desired result, which has heretofore been possible to attain without any problem.

FIGS. 3 to 6 are diagrams showing measured data concerning a $SiO_2$ film with a thickness of about 460 nanometers (nm) provided on a silicon (Si) substrate. FIGS. 3 and 4 are diagrams showing measured data in a case where the spectral reflection intensity is sufficiently high to obtain a film thickness value. Curves a, b and c in FIG. 3 are the spectral reflectance ratios $S(\lambda)$, $R(\lambda)$ and the measured profile $Rmeas(\lambda)=S(\lambda)/R(\lambda)$, respectively, determined at steps ST1, ST2 and ST3 in FIG. 1. Curve e in FIG. 4 is the evaluation function E(d) obtained at step ST5 in FIG. 1.

FIGS. 5 and 6 are diagrams showing measured data in a case where the spectral reflection intensity is not sufficiently high to obtain the desired result. Curves a, b and c in FIG. 5 are the spectral reflectance ratios $S(\lambda)$, $R(\lambda)$ and the measured profile $Rmeas(\lambda)=S(\lambda)/R(\lambda)$, respectively, determined at steps ST1, ST2 and ST3 in FIG. 1. Curve e in FIG. 6 is the evaluation function E(d) obtained at step ST5 in FIG. 1.

In FIGS. 3 and 4, d that gives a minimum value of the evaluation function E(d) shows an accurate film thickness value (460 nanometers). However, in FIGS. 5 and 6, d that gives a minimum value of the evaluation function E(d) does not show an accurate film thickness value.

Some film thickness measuring apparatuses are used to measure a film thickness during polishing or other processing and to detect an end point of such processing. There are demands for such film thickness measuring apparatuses to obtain a measurement result at high speed and in real time. The conventional film thickness measuring apparatus cannot satisfactorily meet the demands.

SUMMARY OF THE INVENTION

The present invention was made in view of the above-described circumstances. An object of the present invention is to provide a film thickness measuring method and a film thickness measuring apparatus capable of measuring a film thickness with high accuracy even if the spectral reflection intensity is not sufficiently high to measure an accurate film thickness and gives a poor S/N ratio.

To attain the above-described object, the present invention provides a film thickness measuring method wherein light is applied to a film under measurement, and reflected light from the upper and lower interface surfaces of the film is received to measure the thickness of the film. According to the film thickness measuring method, a spectral reflectance ratio $S(\lambda)$ at a spot where the film under measurement is present is measured by using light of a plurality of different wavelengths $\lambda(\lambda1 \leq \lambda \leq \lambda2$; a measuring wavelength range), and a spectral reflectance ratio $R(\lambda)$ at a spot where the film under measurement is not present is measured by using the light of a plurality of different wavelengths to determine a measured spectral reflectance ratio $Rmeas(\lambda)=S(\lambda)/R(\lambda)$. A theoretical value $Rcalc(\lambda)$ of a spectral reflectance ratio at an assumed film thickness d is determined, and an evaluation value Ed is determined from the square-sum of differences between the measured spectral reflectance ratio $Rmeas(\lambda)$ and the theoretical value $Rcalc(\lambda)$ of spectral reflectance ratio at the film thickness d according to the following equation:

$$Ed = \sum_{\lambda=\lambda1}^{\lambda2} (Rmeas(\lambda) - Rcalc(\lambda))^2$$

The film thickness d is changed (increased or decreased) in steps of $\Delta d$ in a measuring retrieval range of from d1 to d2 to determine an evaluation value Ed at each relevant film thickness, thereby obtaining an evaluation function E(d) with respect to the film thickness d. Assuming that the spectral reflectance ratio $Rmeas(\lambda e)$ of the film is 1 ($Rmeas(\lambda e)=1$), an evaluation value Enewd is determined from the square-sum of differences between a theoretical value Rcalc $(\lambda e)$ of spectral reflectance ratio at a certain film thickness d and the spectral reflectance ratio $Rmeas(\lambda e)=1$ according to the following equation:

$$Enewd = \sum_{\lambda e=\lambda1}^{\lambda2} (Rcalc(\lambda e) - 1)^2$$

The film thickness d is changed (increased or decreased) in steps of $\Delta d$ in a measuring retrieval range of from d1 to d2 to determine an evaluation value Enewd at each relevant film thickness, thereby obtaining an evaluation function Enew(d). A ratio PE(d) of the evaluation function E(d) to the evaluation function Enew(d) is determined (PE(d)=E(d)/Enew(d)), and a film thickness d that gives a minimum value of the evaluation function ratio PE(d) is determined to be a measured film thickness value D.

In addition, the present invention provides a film thickness measuring apparatus including an optical system for applying light to a film under measurement and for receiving and dispersing reflected light from the upper and lower interface surfaces of the film. The film thickness measuring apparatus further includes a film thickness measuring device for measuring the thickness of the film from the intensity of reflected light received with the optical system. The film thickness measuring device includes a computing unit for executing the following processing: A spectral reflectance ratio $S(\lambda)$ at a spot where the film under measurement is present is measured by using light of a plurality of different wavelengths $\lambda(\lambda1 \leq \lambda \leq \lambda2$; a measuring wavelength range), and a spectral reflectance ratio $R(\lambda)$ at a spot where the film under measurement is not present is measured by using the light of a plurality of different wavelengths to determine a measured spectral reflectance ratio $Rmeas(\lambda)=S(\lambda)/R(\lambda)$. A theoretical value $Rcalc(\lambda)$ of spectral reflectance ratio at an assumed film thickness d is determined, and an evaluation value Ed is determined from the square-sum of differences between the measured spectral reflectance ratio $Rmeas(\lambda)$ and the theoretical value $Rcalc(\lambda)$ of spectral reflectance ratio at the film thickness d according to the following equation:

$$Ed = \sum_{\lambda=\lambda1}^{\lambda2} (Rmeas(\lambda) - Rcalc(\lambda))^2$$

The film thickness d is changed (increased or decreased) in steps of $\Delta d$ in a measuring retrieval range of from d1 to d2 to determine an evaluation value Ed at each relevant film thickness, thereby obtaining an evaluation function E(d) with respect to the film thickness d. Assuming that the spectral reflectance ratio $Rmeas(\lambda e)$ of the film is 1 ($Rmeas(\lambda e)=1$), an evaluation value Enewd is determined from the square-sum of differences between a theoretical value Rcalc (λe) of spectral reflectance ratio at a certain film thickness d and the spectral reflectance ratio Rmeas(λe)=1 according to the following equation:

$$Enewd = \sum_{\lambda e=\lambda 1}^{\lambda 2} (Rcalc(\lambda e) - 1)^2$$

The film thickness d is changed (increased or decreased) in steps of (d in a measuring retrieval range of from d1 to d2 to determine an evaluation value Enewd at each relevant film thickness, thereby obtaining an evaluation function Enew(d). A ratio PE(d) of the evaluation function E(d) to the evaluation function Enew(d) is determined (PE(d)=E(d)/Enew(d)), and a film thickness d that gives a minimum value of the evaluation function ratio PE(d) is determined to be a measured film thickness value D.

Thus, the film thickness measuring method and apparatus according to the present invention obtains an evaluation function Enew(d) of the theoretical value Rcalc(λe) of spectral reflectance ratio and the spectral reflectance ratio of the film under measurement as assumed to be S(λe)/R(λe)=1 for each wavelength λ in the measuring range of the film thickness d. The evaluation function E(d) is divided by the evaluation function Enew(d) (E(d)/Enew(d)) to determine a ratio PE(d) between the evaluation functions, which is a signal component attributable to the proper film thickness, and a film thickness d that gives a minimum value of the ratio PE(d) is decided to be a measured film thickness value D. Accordingly, it is possible to perform film thickness measurement of high accuracy even if the spectral reflection intensity is not sufficiently high to measure an accurate film thickness and gives a poor S/N ratio, as stated later in detail.

BRIEF DESCRIPTION OF THE DRAWINGS

The above and other objects, features and advantages of the present invention will become more apparent from the following description of the preferred embodiments thereof, taken in conjunction with the accompanying drawings.

Figure 1:
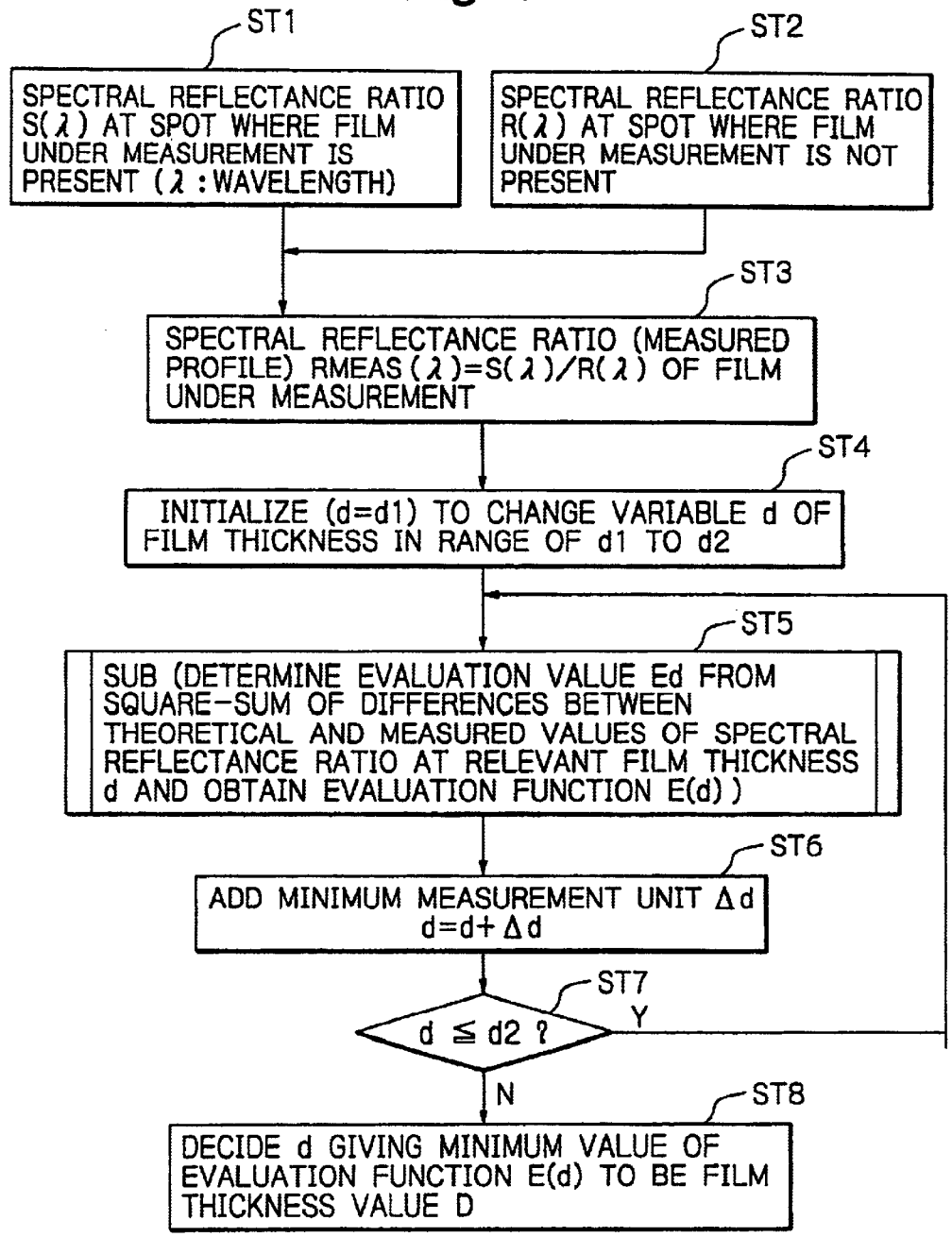
FIG. 1 is a flowchart showing the process for calculating a film thickness in a conventional film thickness measuring apparatus.

Denotation of reference numerals in the drawings is as follows:

1 is a substrate; 2 is a thin film; 3 is a measuring spot; 4 is a water jet; 5 is a water jet nozzle; 6 is a jet of pressurized water; 7 is a light-projecting fiber; 8 is a light-receiving fiber; 9 is a measuring and calculating part; 10 is a halogen light source; 11 is a first lens; 12 is a second lens; 13 is a diffraction grating; 14 is a CCD line sensor; 15 is an A/D converter; 16 is a computing unit; 30 is a turntable; 31 is a polishing cloth; 32 is a substrate carrier; 33 is a substrate to be polished; 34 is a guide ring; 35 is a water receiver; 36 is a pressurized water jet pipe; 37 is a drainage pipe; and 38 is a drainage member.

DESCRIPTION OF THE PREFERRED EMBODIMENTS

Figure 7:
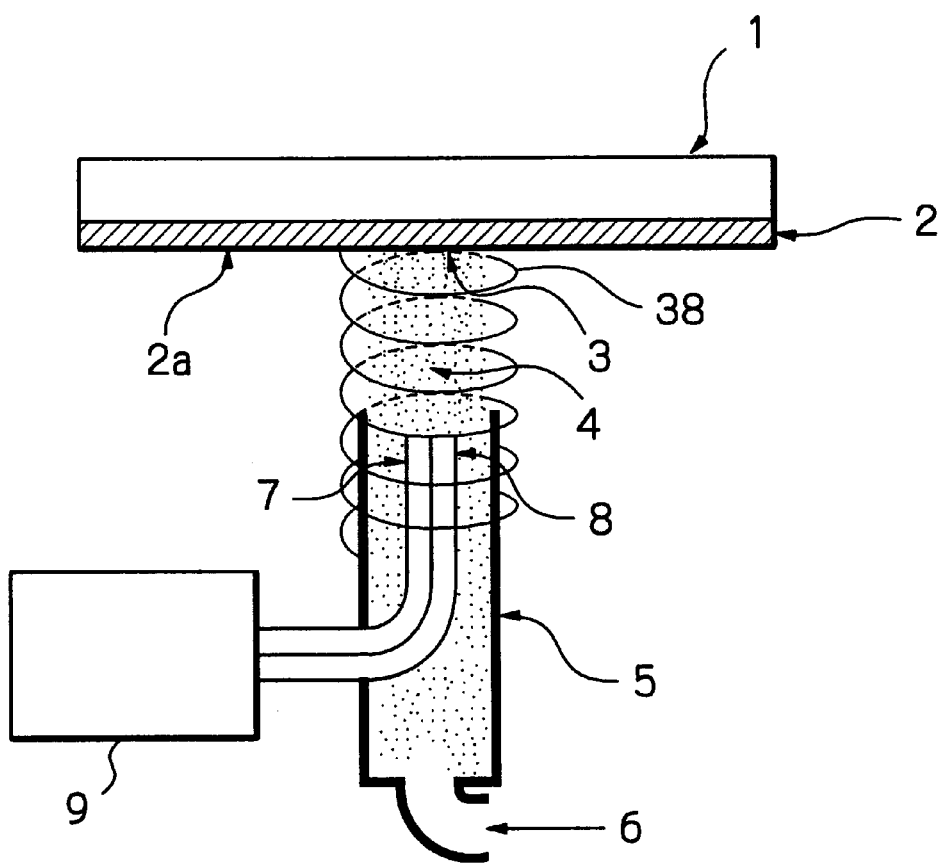
FIG. 7 is a schematic view showing the arrangement of the film thickness measuring apparatus according to the present invention.

Embodiments of the present invention will be described below with reference to the accompanying drawings. FIG. 7 is a schematic view showing the arrangement of the film thickness measuring apparatus according to the present invention. In FIG. 7, a substrate 1 has a thin film 2 formed on a surface thereof The thin film 2 is subjected to film thickness measurement. A water jet nozzle 5 emits a columnar jet of water 4 so that the water jet 4 contacts a measuring spot 3 on the thin film 2 formed on the substrate 1. A light-projecting fiber 7 and a light-receiving fiber 8 are disposed in such a manner that distal end portions thereof are inserted in the water jet nozzle 5.

A jet of pressurized water 6 is supplied to the water jet nozzle 5, and a thin columnar water jet 4 is emitted from the tip of the water jet nozzle 5 so that the water jet 4 contacts a measuring surface 2a of the thin film 2 on the substrate 1 to form a measuring spot 3. In this state, light is sent into the water jet 4 from a measuring and calculating part 9 through the light-projecting fiber 7. Thus, the light is applied through the water jet 4 to the measuring surface 2a in the measuring spot 3 on the substrate 1. It is preferable from the viewpoint of system configuration that the axis of light in the water jet 4 and the measuring surface 2a be approximately perpendicular to each other. However, the axis of light in the water jet 4 may be oblique to the measuring surface 2a, provided that the positional relationship allows the light-receiving fiber 8 to receive reflected light from the measuring surface 2a as illuminated with light from the light-projecting fiber 7.

Reflected light from the measuring surface 2a is led to the measuring and calculating part 9 through the water jet 4 and the light-receiving fiber 8. The measuring and calculating part 9 measures the film thickness of the thin film 2 from the reflected light. The water jet nozzle 5 has a mirror-finished inner surface to efficiently guide illuminating light from the light-projecting fiber 7 and reflected light into the light-receiving fiber 8. In some cases, drops of water may collect in the area of contact between the thin film 2 and the water jet 4, causing the measuring spot 3 to be disordered. To remove water drops, a spirally wound drainage member 38 is provided to extend from the water jet nozzle 5 to the measuring spot 3 on the thin film 2.

In the film thickness measuring apparatus arranged as stated above, if the distance from the tip of the water jet nozzle 5 to the measuring surface 2a of the thin film 2 is short (i.e. if the length of the water jet 4 is short, it is within about 1.5 times the inner diameter of the water jet nozzle 5 in the actual practice), the diameter of the water jet 4 is kept approximately constant. Therefore, the size of the measuring spot 3 on the measuring surface 2a is determined independently of the distance between the measuring surface 2a and the tip of the water jet nozzle 5 and also the distal end of the light-projecting fiber 7. Accordingly, no strict gap control is necessary.

Figure 8:
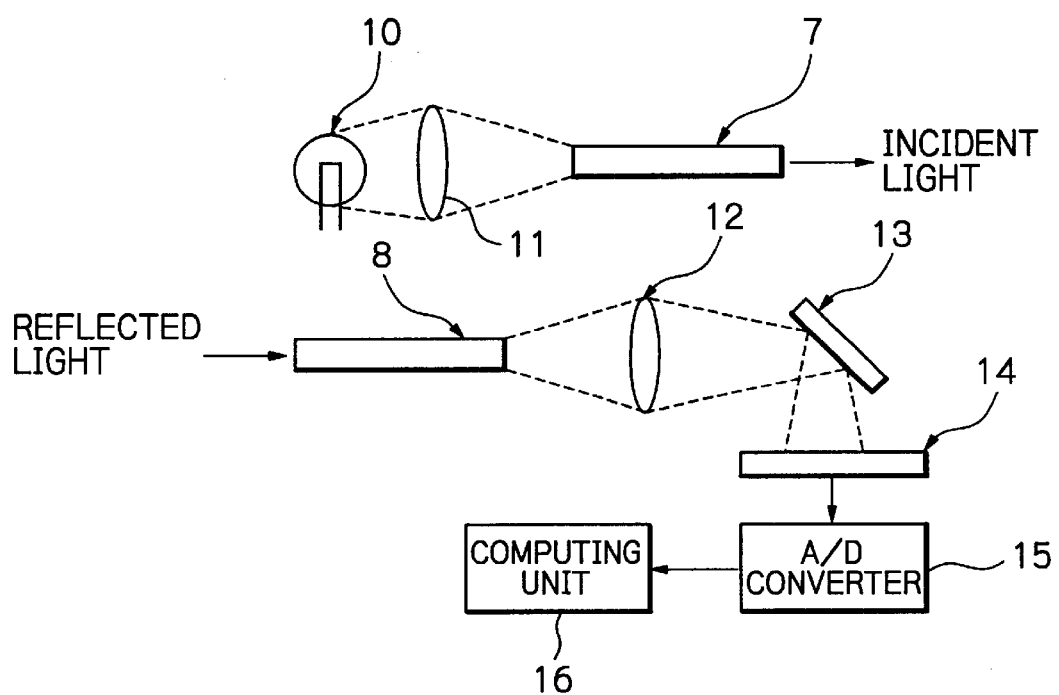
FIG. 8 is a diagram showing a structural example of a measuring and calculating part of the film thickness measuring apparatus according to the present invention.

FIG. 8 is a diagram showing the arrangement of the measuring and calculating part 9. In FIG. 8, light from a halogen light source 10 is led to the light-projecting fiber 7 through a first lens 11 and applied to the measuring surface 2a on the substrate 1 from the distal end of the light-projecting fiber 7 through the water jet 4 (see FIG. 7). Reflected light from the measuring surface 2a passes through the light-receiving fiber 8 and is led to a diffraction grating 13 through a second lens 12. Light dispersed by the diffraction grating 13 is detected with a CCD line sensor 14 as a spectral reflection intensity with respect to the wavelength of light. The spectral reflection intensity is converted into a digital signal in an A/D converter 15 and then sent to a computing unit 16.

Figure 9:
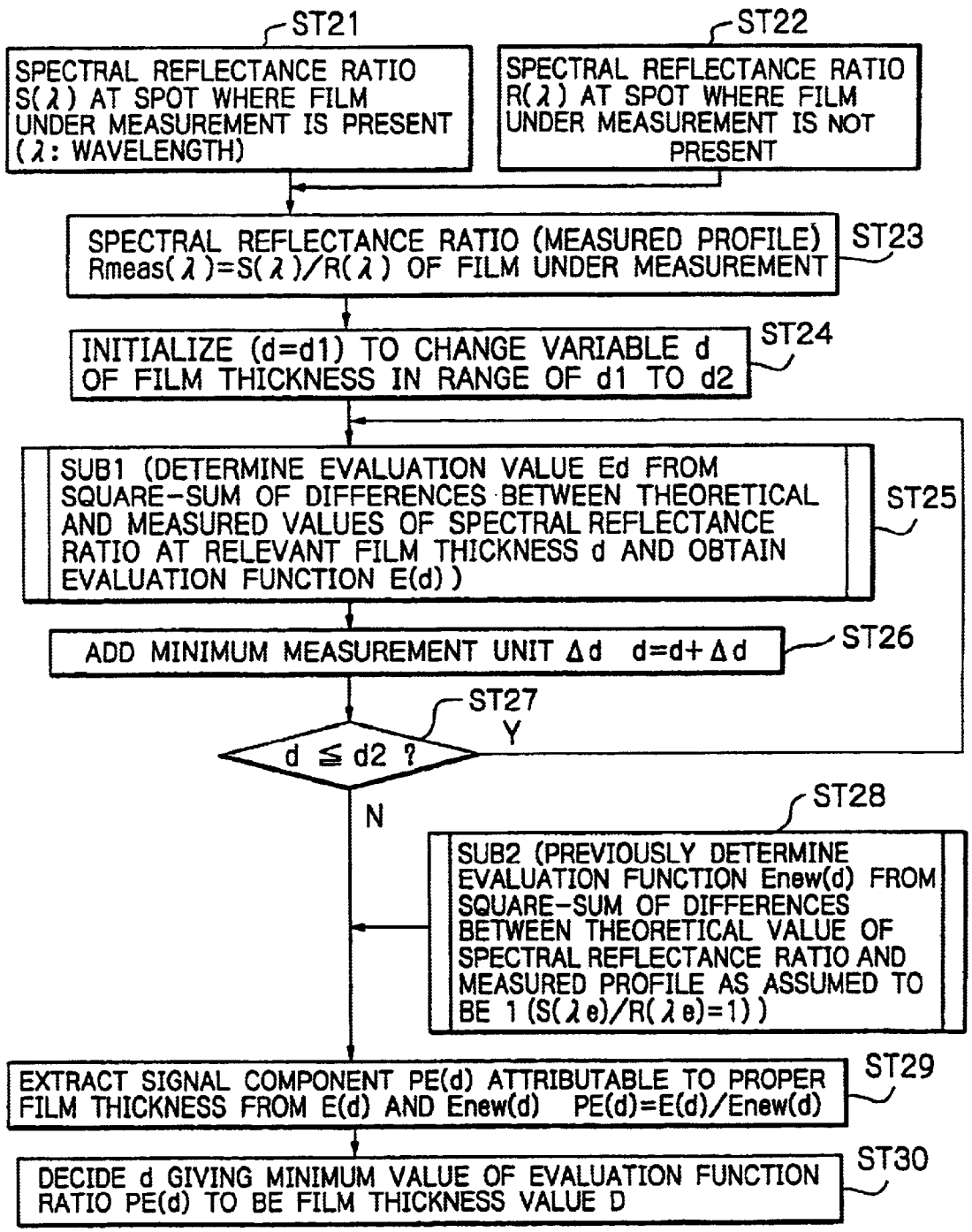
FIG. 9 is a flowchart showing the process for calculating a film thickness in the film thickness measuring apparatus according to the present invention.

FIGS. 9 to 12 are flowcharts showing the process for measuring and calculating a film thickness from the intensity of reflected light received with the film thickness measuring apparatus according to the present invention in a state where the S/N ratio is poor. In FIG. 9, the process executed at steps ST21 to ST27 is the same as the process at steps ST1 to ST7 in FIG. 1. Therefore, a description thereof is omitted. At step ST28, an evaluation function Enew(d) is determined in advance from the square-sum of differences between the theoretical value Rcalc($\lambda$e) of spectral reflectance ratio and the measured profile as assumed to be 1 (S($\lambda$e)/R($\lambda$e)=1).

To extract a signal component PE(d) attributable to the proper film thickness from the evaluation function E(d) of the theoretical value Rcalc($\lambda$) of spectral reflectance ratio and the measured value Rmeas($\lambda$) obtained at step ST25 and the evaluation function Enew(d) obtained in advance at step ST28, the following calculation is performed (step ST29):

$PE(d)=E(d)/Enew(d)$

The value d that gives a minimum value of the ratio PE(d) between the evaluation functions is determined to be a measured film thickness value D (step ST30).

Figure 2:
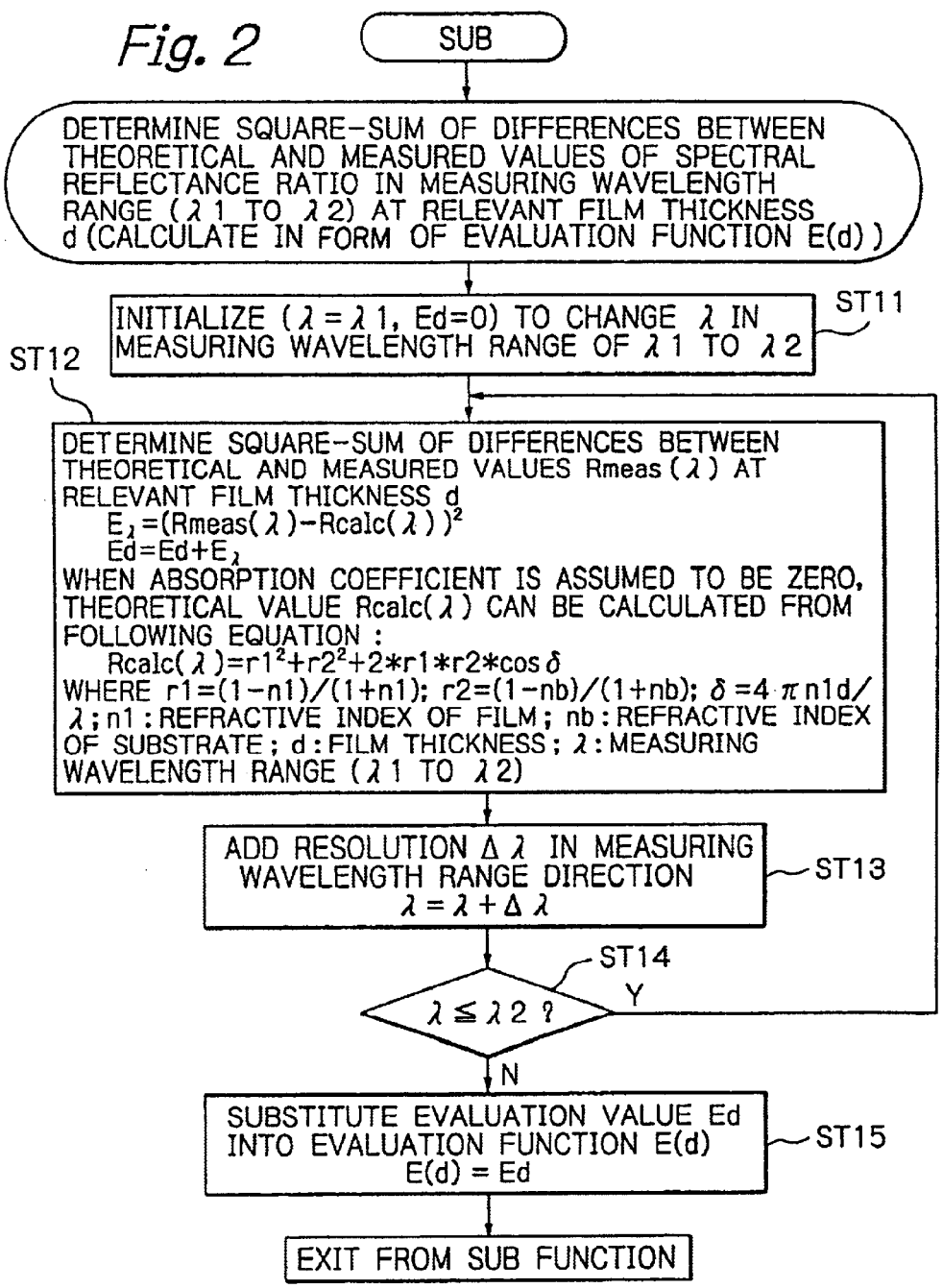
FIG. 2 is a flowchart showing the process for calculating a film thickness in the conventional film thickness measuring apparatus.
Figure 3:
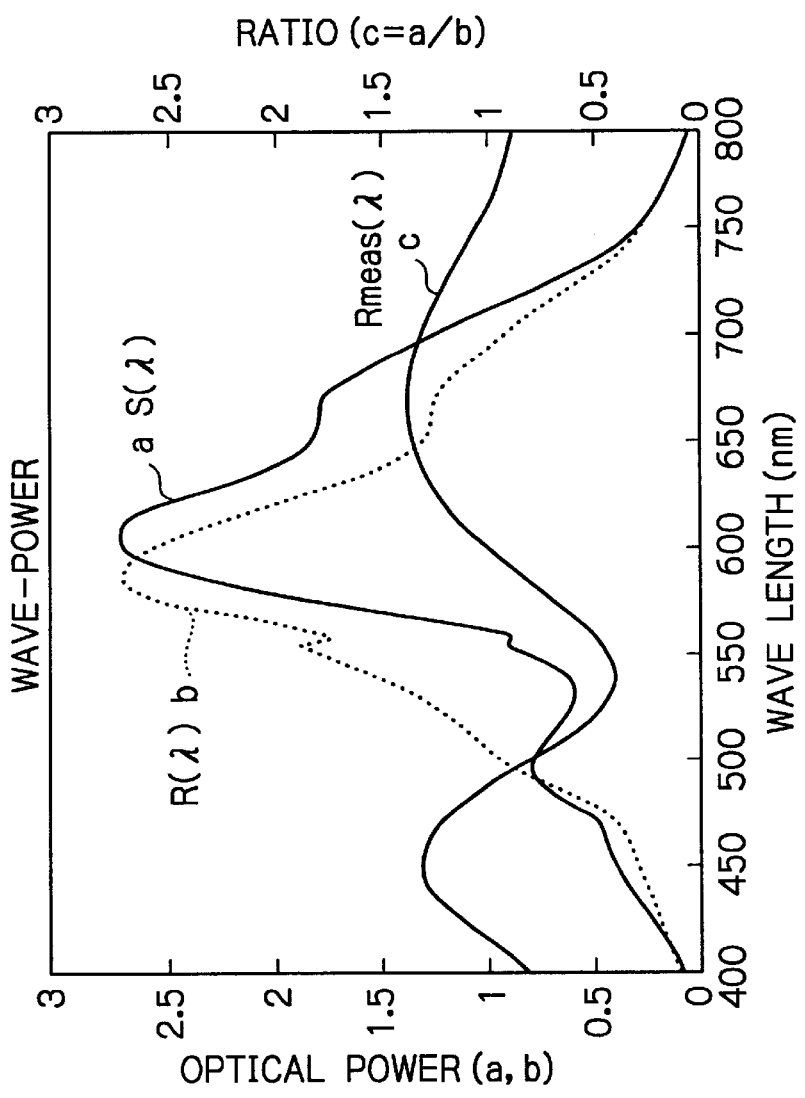
FIG. 3 is a diagram showing spectral reflectance ratios at a spot where a film under measurement is present and at a spot where the film is not present, together with the spectral reflectance ratio of the film, with respect to the wavelength of light in a case where the spectral reflection intensity is high.
Figure 4:
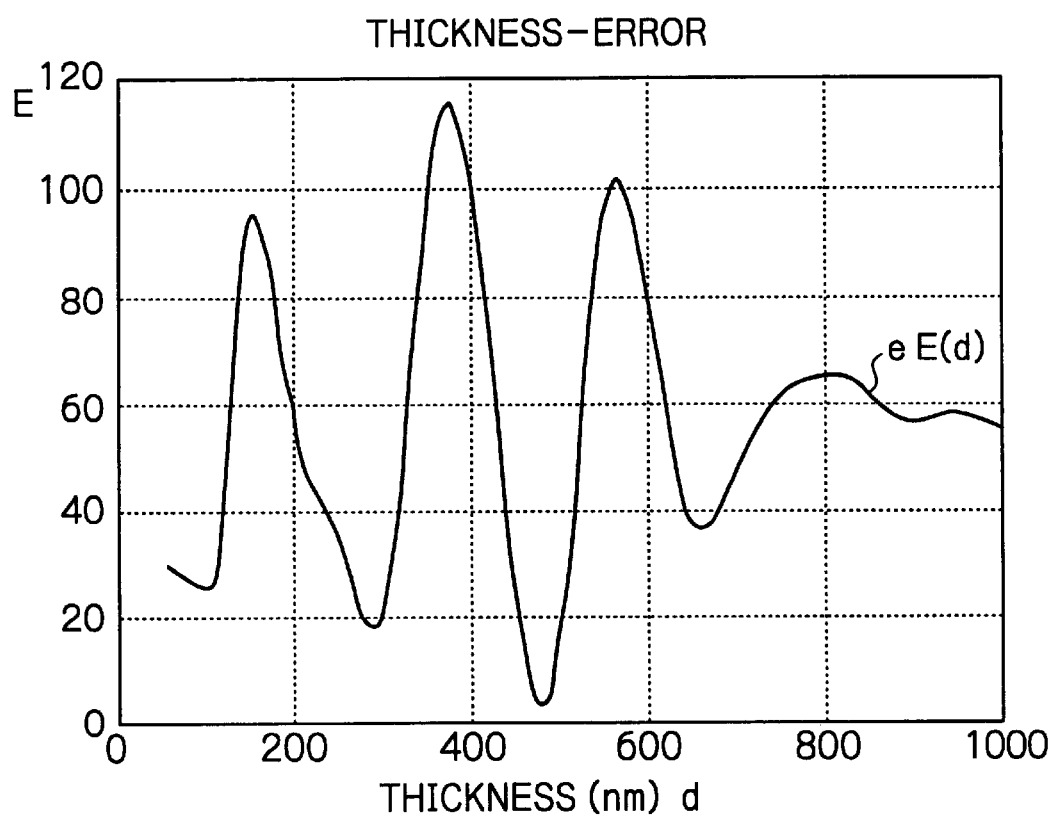
FIG. 4 is a diagram showing an evaluation function of theoretical and measured values of spectral reflectance ratio with respect to the film thickness in a case where the spectral reflection intensity is high.
Figure 10:
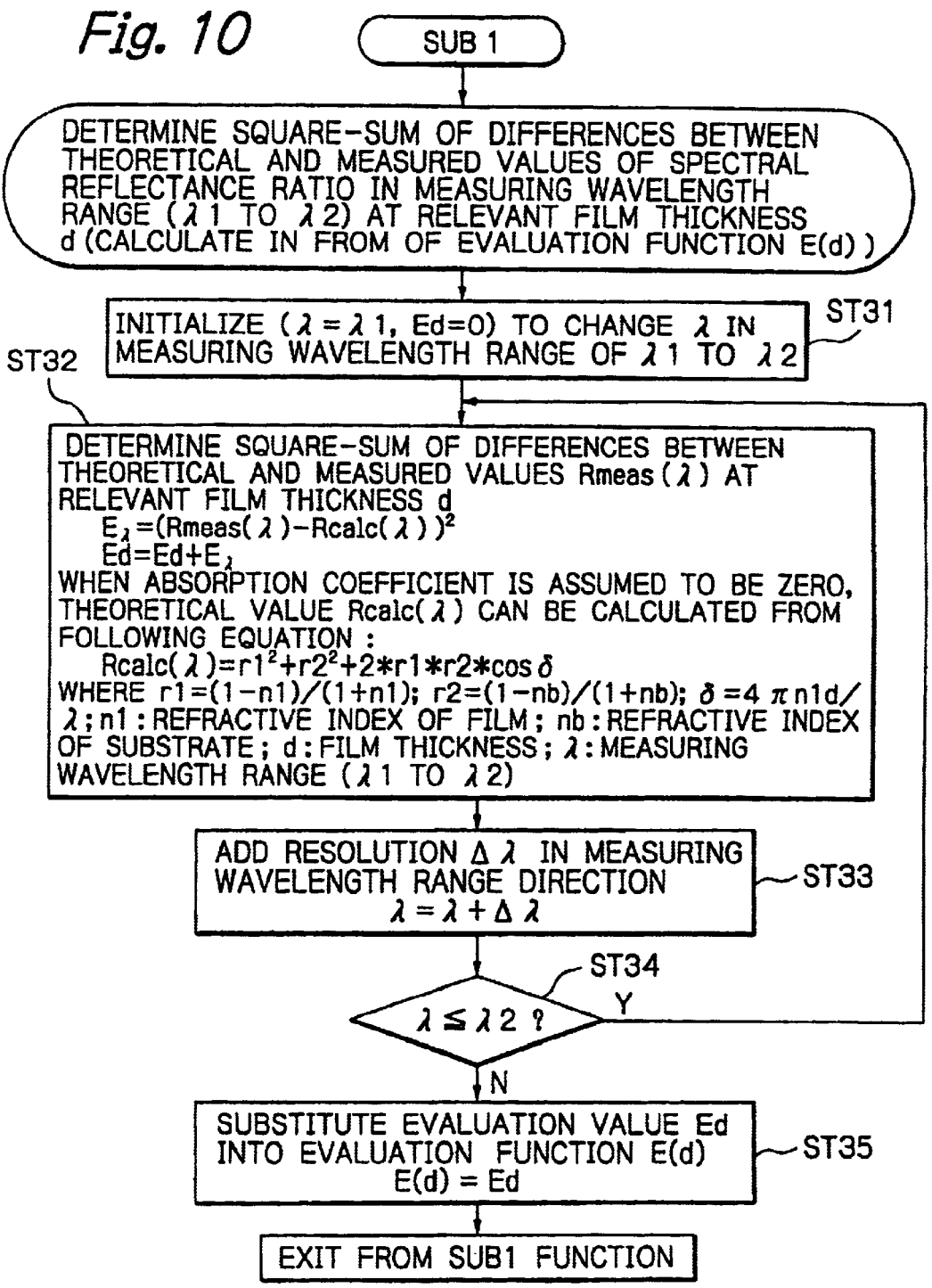
FIG. 10 is a flowchart showing the process for calculating a film thickness in the film thickness measuring apparatus according to the present invention.
Figure 11:
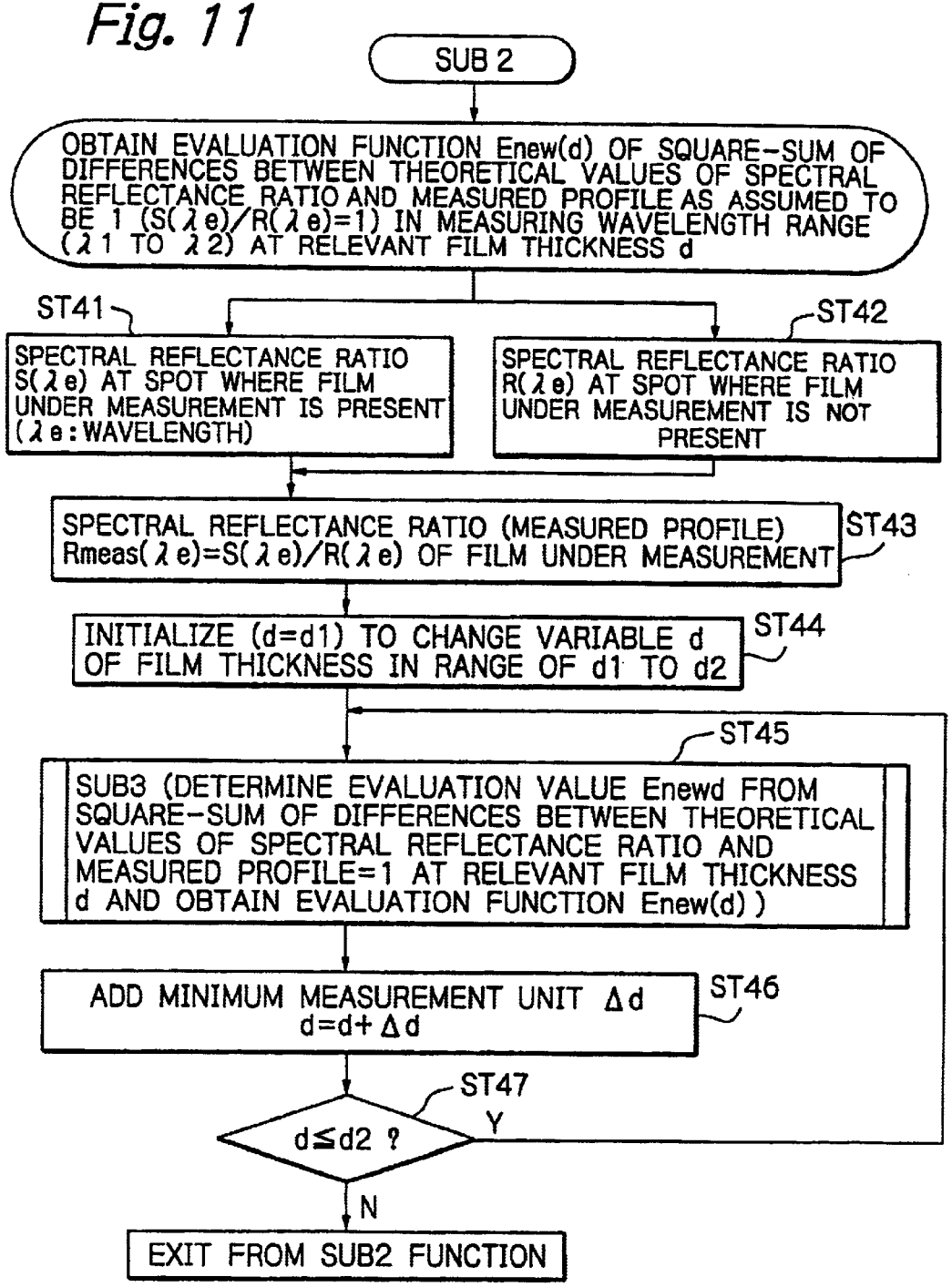
FIG. 11 is a flowchart showing the process for calculating a film thickness in the film thickness measuring apparatus according to the present invention.

The process executed at steps ST31 to ST35 in FIG. 10 is the same as the process at steps ST11 to ST15 in FIG. 2. Therefore, a description thereof is omitted. FIG. 11 is a flowchart showing the process for obtaining the evaluation function Enew(d) of the square-sum of differences between the theoretical value Rcalc($\lambda$e) of spectral reflectance ratio and the measured profile S($\lambda$e)/R($\lambda$e)=1 in the film thickness retrieval range (d1≦d≦d2) at step ST28 in FIG. 9. At steps ST41 to ST43 in FIG. 11, the measured profile is supposed to be 1 (S($\lambda$e)/R($\lambda$e)=1) on the assumption that the spectral reflectance ratio S($\lambda$e) at a spot where the film to be measured is present and the spectral reflectance ratio R($\lambda$e) at a spot where the film to be measured is not present are equal to each other. The variable d of film thickness is changed in a range (from d1 to d2) where the proper film thickness is expected to be present.

Figure 12:
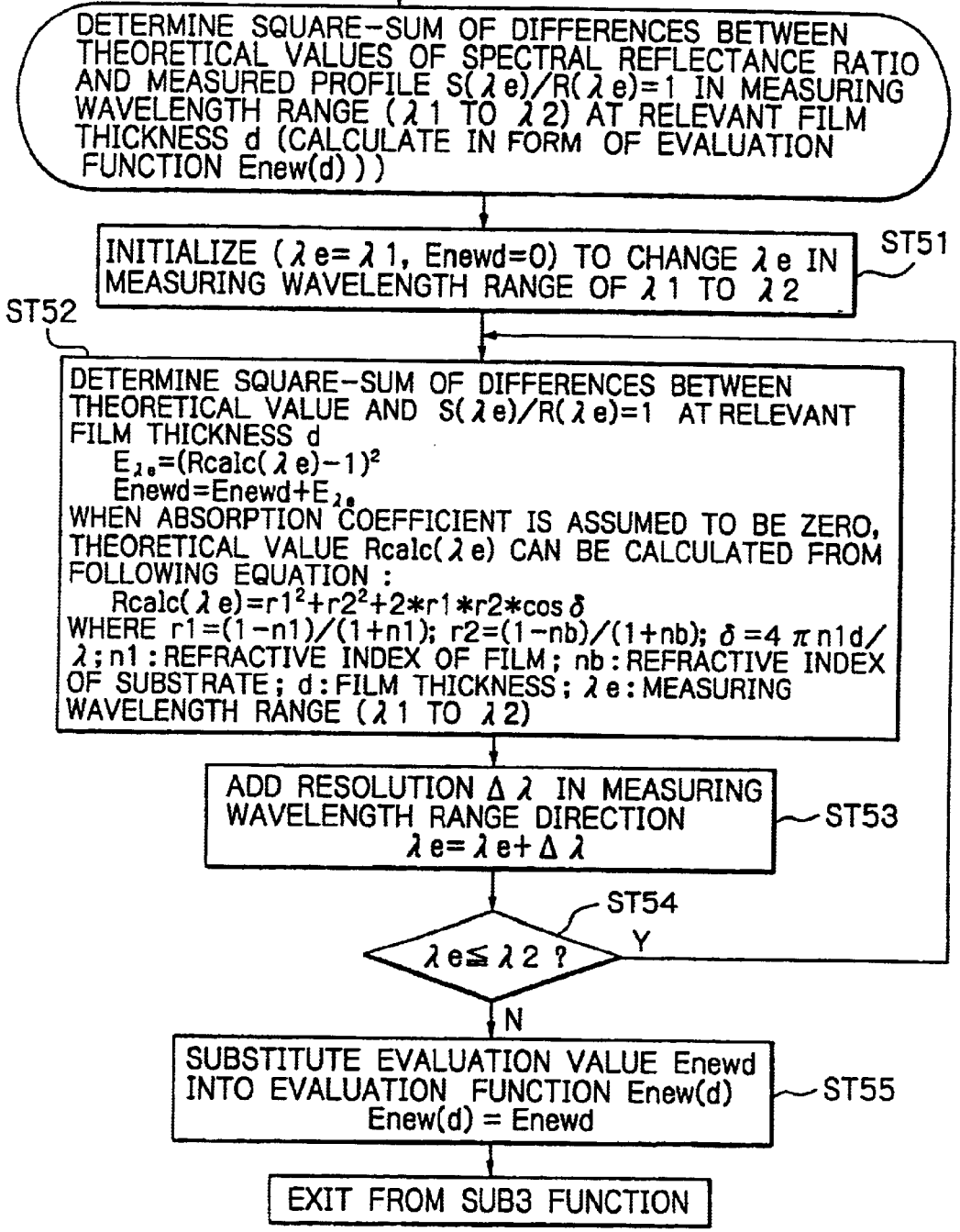
FIG. 12 is a flowchart showing the process for calculating a film thickness in the film thickness measuring apparatus according to the present invention.

First, d is initialized (d=d1) (step ST44). An evaluation value Enewd is determined from the square-sum of differences between the theoretical value Rcalc($\lambda$e) of spectral reflectance ratio and the measured profile S($\lambda$e)/R($\lambda$e)=1 at the relevant film thickness d to obtain an evaluation function Enew(d)(step ST45). A minimum unit Δd of measurement is added (d=d+Δd) (step ST46). Subsequently, it is determined whether or not d≦d2 (step ST47). If d≦d2, the process returns to step ST45 to repeat the processing. If d≦d2 does not hold, the process proceeds to step ST29 in FIG. 9. FIG. 12 is a flowchart showing the process for determining an evaluation value Enewd from the square-sum of differences between the theoretical value of spectral reflectance ratio and the measured profile S($\lambda$e)/R($\lambda$e)=1 in the measuring wavelength range (from $\lambda$1 to $\lambda$2) at the relevant film thickness d to obtain an evaluation function Enew(d) at step ST45. First, initialization is executed ($\lambda$e=$\lambda$1, Enew=0) to change the wavelength $\lambda$e in the measuring wavelength range of from $\lambda$1 to $\lambda$2 (step ST51).

The square-sum of differences between the theoretical value Rcalc and the measured profile S($\lambda$e)/R($\lambda$e)=1 at the relevant film thickness d is determined (step ST52).

$E_{\lambda e}=(Rcalc(\lambda e)-1)^2$ $Enewd=Enewd+E_{\lambda e}$

When the absorption coefficient is assumed to be zero, the theoretical value Rcalc($\lambda$e) is calculated from the following equation:

$Rcalc(\lambda e)=r1^2+r2^2+2\times r1\times r2\times\cos\delta$ where r1=(1−n1)/(1+n1); r2=(1−nb)/(1+nb); δ=4πn1d/$\lambda$e; n1 is the refractive index of the film; nb is the refractive index of the substrate; d is the film thickness; and $\lambda$e is the measuring wavelength range (from $\lambda$1 to $\lambda$2).

The resolution Δ$\lambda$ in the direction of the measuring wavelength range is added ($\lambda$e=$\lambda$e+Δ$\lambda$)) (step ST53). Then, it is determined whether or not $\lambda$e ≦$\lambda$2 (step ST54). If, $\lambda$e ≦$\lambda$2 the process returns to step ST52 to repeat the processing. If $\lambda$e≦$\lambda$2 does not hold, the evaluation value Enewd is substituted into the evaluation function Enew(d) (Enew(d)= Enewd) (step ST55). Then, the process proceeds to step ST46 in FIG. 11.

Figure 5:
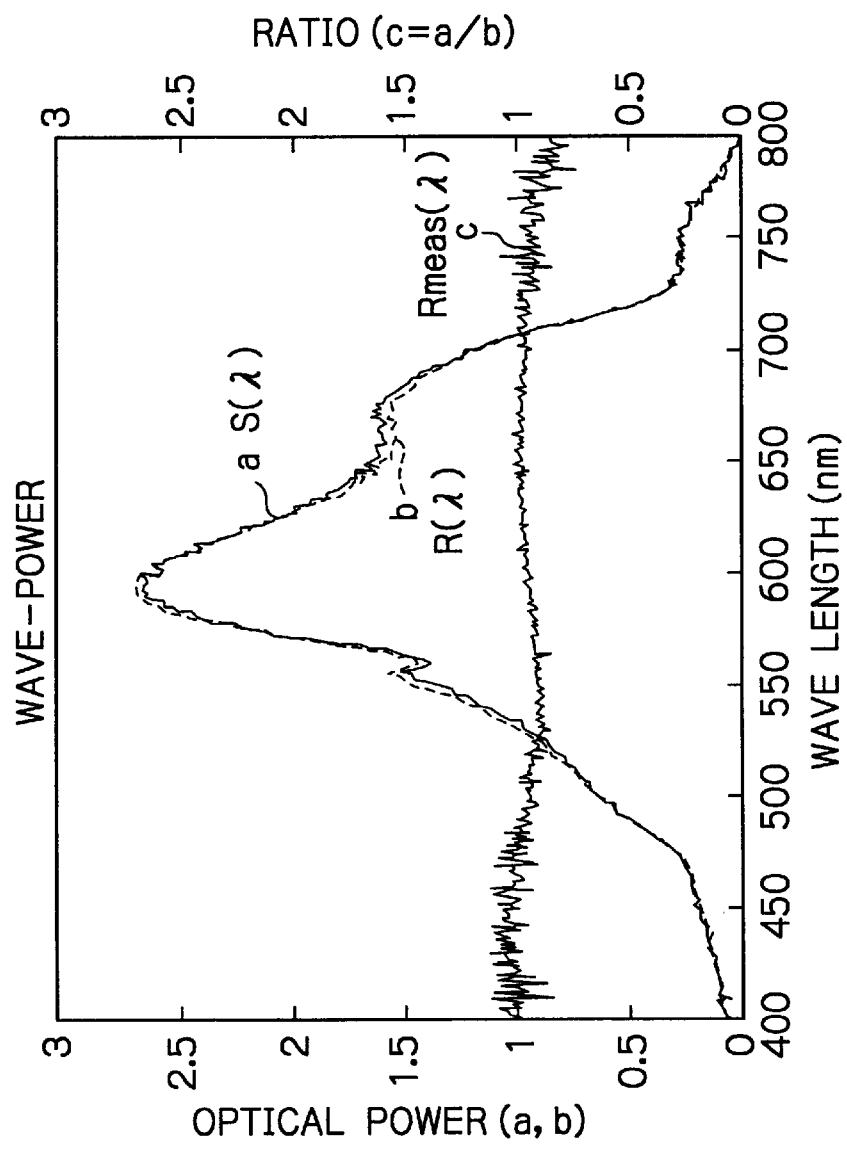
FIG. 5 is a diagram showing spectral reflectance ratios at a spot where a film under measurement is present and at a spot where the film is not present, together with the spectral reflectance ratio of the film, with respect to the wavelength of light in a case where the spectral reflection intensity is low.
Figure 6:
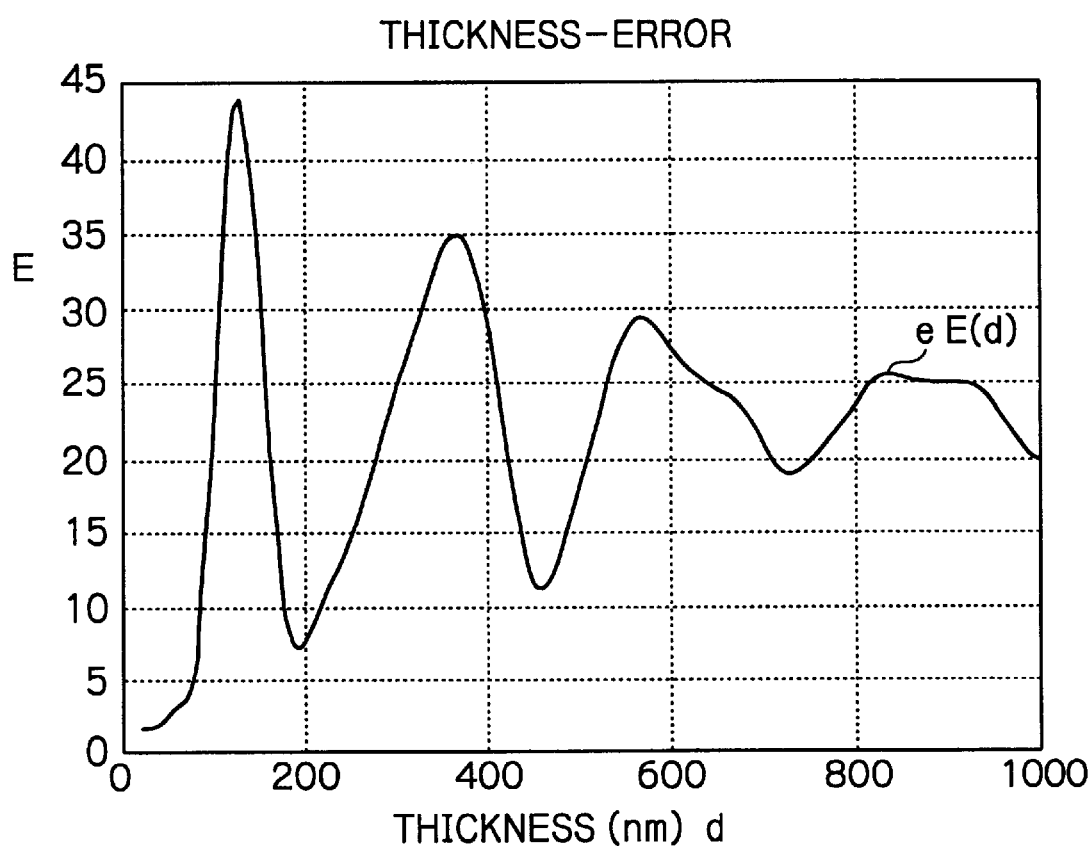
FIG. 6 is a diagram showing an evaluation function of theoretical and measured values of spectral reflectance ratio with respect to the film thickness in a case where the spectral reflection intensity is low.
Figure 13:
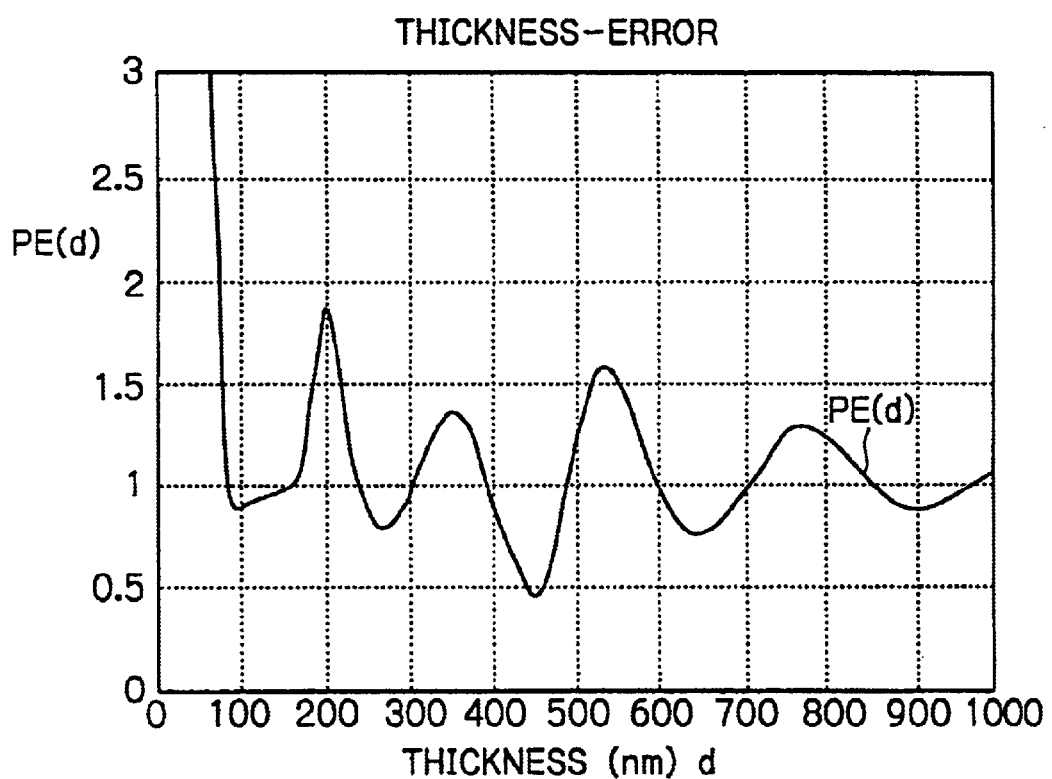
FIG. 13 is a diagram showing an evaluation function of theoretical and measured values of spectral reflectance ratio with respect to the film thickness measured with the film thickness measuring apparatus according to the present invention in a case where the spectral reflection intensity is low.

If the above-described process is executed under conditions where the spectral reflection intensity is not sufficiently high to obtain an accurate film thickness value as shown in FIGS. 5 and 6, the ratio PE(d) between the evaluation functions, which is a signal component attributable to the proper film thickness, is as shown in FIG. 13. Thus, d that gives a minimum value of the ratio PE(d) between the evaluation functions shows an accurate film thickness value (460 nanometers). Regarding the number of evaluation values Ed and Enewd needed to obtain the evaluation functions E(d) and Enew(d), at least 10-odd points should preferably be selected from the wavelength region (from $\lambda 1$ to $\lambda 2$) of visible rays to deduce evaluation functions from the practical point of view (in view of the computing speed that allows real-time film thickness detection).

Figure 14:
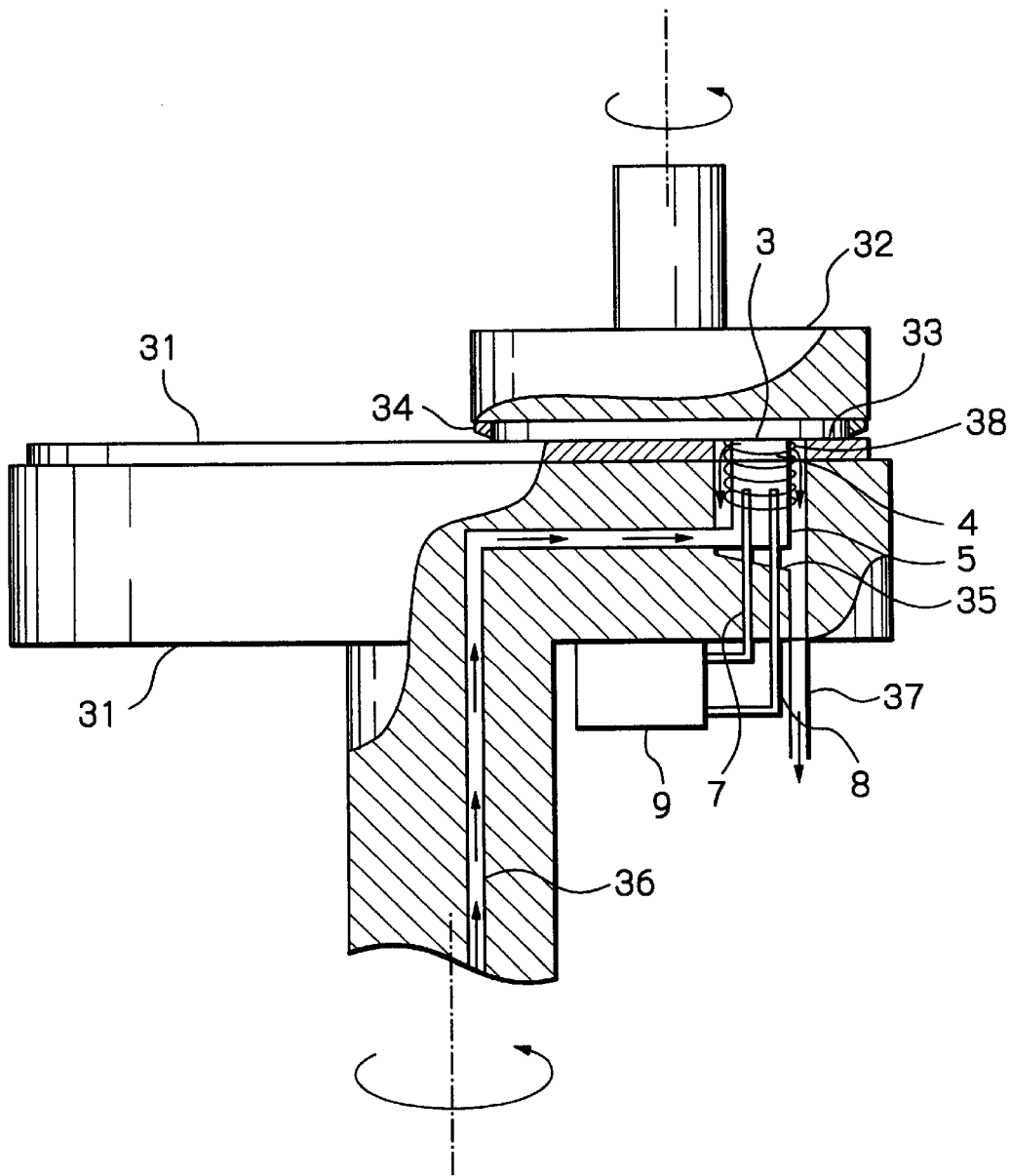
FIG. 14 is a diagram showing a structural example of a chemical/mechanical polishing apparatus equipped with the film thickness measuring apparatus according to the present invention.

FIG. 14 is a diagram showing an example in which the film thickness measuring apparatus according to the present invention is provided in a chemical/mechanical polishing apparatus (CMP) to allow measurement of the thickness of a film on a substrate surface that is being polished. In FIG. 14, a turntable 30 has a polishing cloth 31 bonded to the upper surface thereof. A substrate 33 to be polished is fitted to the lower surface of a substrate carrier 32. The substrate 33 is held between the substrate carrier 32 and the polishing cloth 31 under a predetermined pressure. A guide ring 34 is mounted on the outer peripheral portion of the lower surface of the substrate carrier 32 to prevent the substrate 33 from dislodging from the substrate carrier 32.

The substrate carrier 32 and the turntable 30 rotate independently of each other. Meanwhile, a polishing solution is supplied to the upper surface of the polishing cloth 31 from a polishing solution supply nozzle (not shown). The surface to be polished of the substrate 33 (the surface that is in contact with the polishing cloth 31) is polished by the relative movement between the substrate 33 and the polishing cloth 31. A water jet nozzle 5 similar to that in FIG. 7 is connected with a pressurized water jet pipe 36. Water 4 jetting out from the water jet nozzle 5 is received with a water receiver 35 and discharged through a drainage pipe 37. The upper end of the water receiver 35 opens on the upper surface of the polishing cloth 31. A jet of water 4 emitted from the water jet nozzle 5 forms a measuring spot 3 on the surface to be polished of the substrate 33 in the same way as in FIG. 7. It should be noted that in FIG. 14 the water jet nozzle 5 is shown large in size for the purpose of facilitating understanding. Actually, the water jet nozzle 5 has a small diameter (from 0.4 millimeters to 0.7 millimeters) to form a small measuring spot 3.

A light-projecting fiber 7 and a light-receiving fiber 8 are disposed in such a manner that distal end portions thereof are inserted in the water jet nozzle 5 as in the case of FIG. 7. Light is led from a measuring and calculating part 9 into the water jet nozzle 5 through the light-projecting fiber 7 and projected through the water jet 4 emitted from the water jet nozzle 5 to illuminate an area within a measuring spot 3 on the surface being polished at which the water jet 4 contacts the surface. Reflected light from the surface being polished is led to the measuring and calculating part 9 through the water jet 4 and the light-receiving fiber 8.

The measuring and calculating part 9 is arranged as shown in FIG. 8. The measuring and calculating part 9 executes the processing shown in FIGS. 9 to 12 to measure the thickness of the film on the surface of the substrate 33 being polished. Electric power for the measuring and calculating part 9 and an output signal therefrom are supplied and delivered through a rotary joint (not shown) provided at the lower end of a rotary driving shaft of the turntable 30. Pressurized water is supplied to the pressurized water jet pipe 36 through a rotary joint mechanism (not shown) installed at the lower end of the rotary driving shaft.

In a polishing apparatus such as a chemical/mechanical polishing apparatus (CMP), it is generally difficult to obtain a sufficiently high spectral reflection intensity from the surface being polished to measure an accurate film thickness. However, if the film thickness measuring apparatus according to the present invention is provided in such a polishing apparatus as stated above, it is possible to perform film thickness measurement of high accuracy even in a case where it is difficult to obtain a sufficiently high spectral reflection intensity.

Although the foregoing embodiment provides an example in which the thickness of a thin film formed on a substrate is measured, the present invention is not necessarily limited thereto. The present invention is also applicable to the detection of a substrate condition, for example, as to whether or not a metal film is present on a substrate, or the observation of a substrate condition.

As has been stated above, according to the present invention, a ratio PE(d) of the evaluation function E(d) to the evaluation function Enew(d) is determined (PE(d)=E(d)/Enew(d)), and a film thickness d that gives a minimum value of the evaluation function ratio PE(d) is determined to be measured film thickness value D. Therefore, it is possible to perform film thickness measurement of high accuracy even if the spectral reflection intensity is not sufficiently high to measure an accurate film thickness and gives a poor S/N ratio.

It should be noted that the present invention is not limited to the foregoing embodiments, and can be modified in a variety of ways.

What is claimed is:

1. A film thickness measuring method wherein light is applied to a film to be measured, and reflected light from upper and lower interface surfaces of the film is received to measure a thickness of the film, said film thickness measuring method comprising:

measuring a spectral reflectance ratio $S(\lambda)$ at a spot where the film to be measured is present by using light having a plurality of different wavelengths $\lambda$, wherein each wavelength $\lambda$ is within a measuring wavelength range $\lambda 1 \leq \lambda \leq \lambda 2$;

measuring a spectral reflectance ratio $R(\lambda)$ at a spot where the film to be measured is not present by using the light having a plurality of different wavelengths;

determining a measured spectral reflectance ratio Rmeas $(\lambda)=S(\lambda)/R(\lambda)$;

determining a theoretical value $Rcalc(\lambda)$ of spectral reflectance ratio at an assumed film thickness d;

determining an evaluation value Ed from a square-sum of differences between the measured spectral reflectance ratio $Rmeas(\lambda)$ and the theoretical value $Rcalc(\lambda)$ of spectral reflectance ratio at the film thickness d according to the following equation:

$$Ed = \sum_{\lambda=\lambda 1}^{\lambda 2} (Rmeas(\lambda) - Rcalc(\lambda))^2$$

changing the film thickness d by increasing or decreasing the film thickness d in steps of $\Delta d$ in a measuring retrieval range of from d1 to d2 to determine an evaluation value Ed at each relevant film thickness, thereby obtaining an evaluation function E(d) with respect to the film thickness d;

assuming a spectral reflectance ratio $Rmeas(\lambda e)$ of the film to be equal to 1 and determining an evaluation value Enewd from a square-sum of differences between a theoretical value $Rcalc(\lambda e)$ of spectral reflectance ratio at a certain film thickness d and the spectral reflectance ratio Rmeas($\lambda$e)=1 according to the following equation:

$$Enewd = \sum_{\lambda e=\lambda 1}^{\lambda 2} (Rcalc(\lambda e) - 1)^2$$

changing the film thickness by increasing or decreasing the film thickness d in steps of $\Delta$d in a measuring retrieval range of from d1 to d2 to determine an evaluation value Enewd at each relevant film thickness, thereby obtaining an evaluation function Enew(d);

determining a ratio PE(d) of the evaluation function E(d) to the evaluation function Enew(d) as follows: PE(d)= E(d)/Enew(d); and determining a film thickness d that gives a minimum value of the ratio PE(d) to be a measured film thickness value D.

2. A film thickness measuring apparatus comprising:

an optical system for applying light to a film under measurement and for receiving and dispersing reflected light from upper and lower interface surfaces of the film; and a film thickness measuring component for measuring a thickness of the film based on an intensity of reflected light received by said optical system, said film thickness measuring component including a computing device for:

measuring a spectral reflectance ratio S($\lambda$) at a spot where the film to be measured is present by using light having a plurality of different wavelengths $\lambda$, wherein each wavelength $\lambda$ is within a measuring wavelength range $\lambda 1 \leq \lambda \leq \lambda 2$;

measuring a spectral reflectance ratio R($\lambda$) at a spot where the film to be measured is not present by using the light having a plurality of different wavelengths;

determining a measured spectral reflectance ratio Rmeas($\lambda$)=S($\lambda$)/R($\lambda$);

determining a theoretical value Rcalc($\lambda$) of spectral reflectance ratio at an assumed film thickness d;

determining an evaluation value Ed from a square-sum of differences between the measured spectral reflectance ratio Rmeas($\lambda$) and the theoretical value Rcalc($\lambda$) of spectral reflectance ratio at the film thickness d according to the following equation:

$$Ed = \sum_{\lambda=\lambda 1}^{\lambda 2} (Rmeas(\lambda) - Rcalc(\lambda))^2$$

changing the film thickness d by increasing or decreasing the film thickness d in steps of $\Delta$d in a measuring retrieval range of from d1 to d2 to determine an evaluation value Ed at each relevant film thickness, thereby obtaining an evaluation function E(d) with respect to the film thickness d;

assuming a spectral reflectance ratio Rmeas($\lambda$e) of the film to be equal to 1 and determining an evaluation value Enewd from a square-sum of differences between a theoretical value Rcalc($\lambda$e) of spectral reflectance ratio at a certain film thickness d and the spectral reflectance ratio Rmeas($\lambda$e)=1 according to the following equation:

$$Enewd = \sum_{\lambda e=\lambda 1}^{\lambda 2} (Rcalc(\lambda e) - 1)^2$$

changing the film thickness by increasing or decreasing the film thickness d in steps of $\Delta$d in a measuring retrieval range of from d1 to d2 to determine an evaluation value Enewd at each relevant film thickness, thereby obtaining an evaluation function Enew(d);

determining a ratio PE(d) of the evaluation function E(d) to the evaluation function Enew(d) as follows: PE(d)=E(d)/Enew(d); and determining a film thickness d that gives a minimum value of the ratio PE(d) to be a measured film thickness value D.

* * * * *